United States Patent
Wu et al.

(10) Patent No.: US 10,804,966 B2
(45) Date of Patent: Oct. 13, 2020

(54) STORAGE CONTROL DEVICE AND METHOD THEREOF

(71) Applicant: RayMX Microelectronics, Corp., Anhui province (CN)

(72) Inventors: Jo-Hua Wu, Pingtung County (TW); Cheng-Yu Chen, New Taipei (TW)

(73) Assignee: RAYMX MICROELECTRONICS, CORP., Anhui Province (CN)

( * ) Notice: Subject to any disclaimer, the term of this patent is extended or adjusted under 35 U.S.C. 154(b) by 0 days.

(21) Appl. No.: 16/784,300

(22) Filed: Feb. 7, 2020

(65) Prior Publication Data
US 2020/0177236 A1    Jun. 4, 2020

Related U.S. Application Data

(63) Continuation of application No. 16/367,393, filed on Mar. 28, 2019, now Pat. No. 10,594,366.

(30) Foreign Application Priority Data

Apr. 26, 2018 (TW) .............................. 107114312 A

(51) Int. Cl.
*H04B 3/00* (2006.01)
*H04B 3/54* (2006.01)

(52) U.S. Cl.
CPC ....... *H04B 3/54* (2013.01); *H04B 2203/5429* (2013.01)

(58) Field of Classification Search
CPC .......................... H04B 3/54; H04B 2203/5429
USPC ..................... 375/257, 377; 340/12.32, 12.33
See application file for complete search history.

(56) References Cited

U.S. PATENT DOCUMENTS

| 7,023,324 B2 | 4/2006 | Kodama et al. |
| 8,538,594 B2 | 9/2013 | Lin et al. |
| 9,817,725 B2 | 11/2017 | Tsai et al. |
| 2003/0156014 A1 | 8/2003 | Kodama et al. |
| 2008/0055052 A1 | 3/2008 | Chang et al. |
| 2010/0316140 A1 | 12/2010 | Razazian et al. |
| 2012/0195384 A1 | 8/2012 | Sato |

(Continued)

FOREIGN PATENT DOCUMENTS

| TW | 200304286 A | 9/2003 |
| TW | 200803212 A | 1/2008 |

(Continued)

OTHER PUBLICATIONS

TW Office Action dated Mar. 6, 2019 in corresponding Taiwan application (No. 107114312).

(Continued)

*Primary Examiner* — Tesfaldet Bocure
(74) *Attorney, Agent, or Firm* — McClure, Qualey & Rodack, LLP

(57) ABSTRACT

A data storage device includes a power line communication (PLC) circuit and a storage controller. The PLC circuit is coupled to a power line. The storage controller is coupled to the PLC circuit. The storage controller is configured to access a plurality of memory block. The PLC circuit is configured to carry at least one signal outputted from the storage controller on the power line, in order to transmit the at least one signal to an external device such that an operational state of the data storage device can be debugged/monitored.

20 Claims, 3 Drawing Sheets

(56) References Cited

U.S. PATENT DOCUMENTS

| | | |
|---|---|---|
| 2019/0132928 A1 | 5/2019 | Rodinger et al. |
| 2019/0155352 A1 | 5/2019 | Chung et al. |
| 2020/0150976 A1* | 5/2020 | Lee .................. G06F 1/266 |

FOREIGN PATENT DOCUMENTS

| | | |
|---|---|---|
| TW | 200812264 A | 3/2008 |
| TW | M420132 U1 | 1/2012 |
| TW | 201218659 A1 | 5/2012 |
| TW | 201541251 A | 11/2015 |

OTHER PUBLICATIONS

TW Office Action dated Apr. 16, 2020 in Taiwan application (No. 108114599).

\* cited by examiner

STORAGE CONTROL DEVICE AND METHOD THEREOF

RELATED APPLICATIONS

This application is a continuation of U.S. application Ser. No. 16/367,393, filed on Mar. 28, 2019, now issued as U.S. Pat. No. 10,594,366 on Mar. 17, 2020, which claims priority to Taiwanese Application Serial Number 107114312, filed Apr. 26, 2018, which is herein incorporated by reference.

BACKGROUND OF THE INVENTION

1. Field of the Invention

The present disclosure relates to storage device, especially to a storage device, a memory control circuit that use an existing interface for monitoring an operational state of the storage device.

2. Description of Related Art

Storage devices are widely used in a variety of electronic products. In order to verify or check the operational state of the storage device, it is conventional to provide additional pins within the storage device or to use one or more pins on an original external interface that was originally used to transmit data for monitoring the operational state of the storage device. However, in the case of setting extra pins, it is inconvenient for the user to remove the housing of the storage device before connecting to the additional pins within the memory device. If the pins on the original external interface are used for monitoring, they may not meet the requirements of different manufacturers, resulting in reduced compatibility of the memory device.

SUMMARY OF THE INVENTION

The present disclosure discloses a storage control device for accessing at least one of memory blocks. The storage control device comprising: an interface, coupled to the storage control circuit, configured to couple to a host system, wherein the interface comprises a plurality of data pins and a plurality of power pins, wherein the apparatus receives an electric power from a power source via the plurality of power pins and a power line; a power line communication (PLC) module, coupled to at least one of the plurality of power pins, configured to acquire an encoded signal in the power line, to decode the encoded signal from the power line to generate a decode signal; and a storage control circuit, coupled to the plurality of data pins and the power line communication module, configured to access at least one of memory blocks according to a command from the host via the plurality of data pins, to perform a corresponding program according to the decode signal of the PLC module, and to produce a response signal to the power line via the PLC module and the at least one of the plurality of power pins of the interface.

The present disclosure further discloses a storage control method for accessing at least one of memory blocks. The control method comprising: Providing an interface comprising a plurality of data pins and a plurality of power pins, wherein the plurality of power pins receives an electric power from a power line; acquiring an encoded signal in the power line on at least one of the plurality of power pins; decoding, by a power line communication (PLC) module, the encoded signal from the power line to generate a decoded signal; accessing, by a storage controller, at least one of memory blocks according to a command from a host via the plurality of data pins; and performing, by the storage controller, a corresponding program according to the decoded signal of the PLC module to produce a response signal to the power line via the at least one of the plurality of power pins of the interface.

DETAILED DESCRIPTION OF THE EXEMPLARY EMBODIMENTS

The following description is written by referring to terms acknowledged in this industrial field. If any term is defined in this specification, such term should be explained accordingly.

Figure 1:
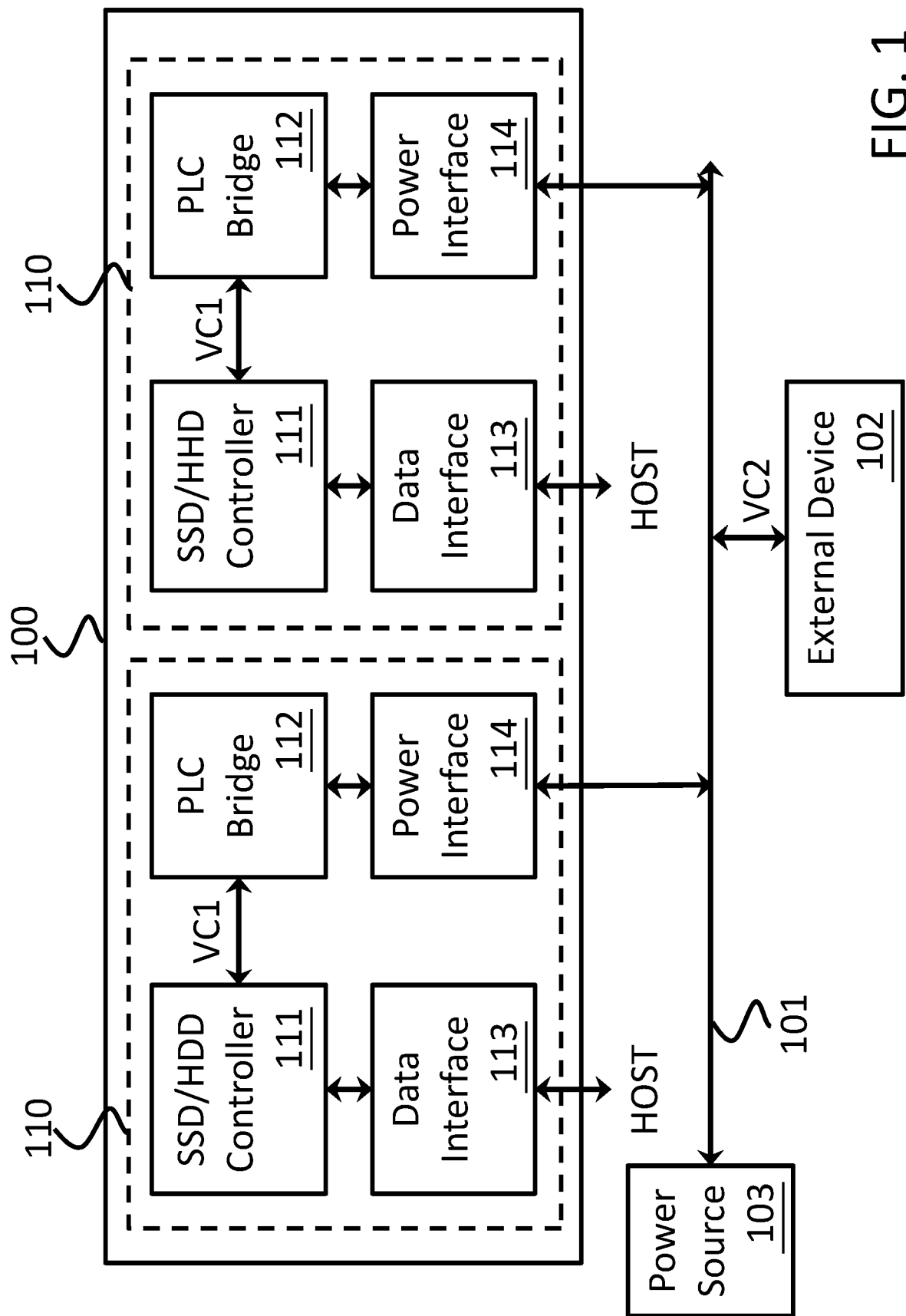
FIG. 1 illustrates a block diagram of an embodiment of the storage device according to the present disclosure.

Referring to FIG. 1, FIG. 1 is a schematic diagram of a storage system 100 according to an embodiment of the present disclosure. In various embodiments, the storage system 100 can include a conventional hard disk (HDD), a solid state hybrid hard disk (SSHD), a solid state hard disk (SSD), etc., but the present invention is not limited thereto.

In some embodiments, the data storage system 100 includes a plurality of storage devices 110. Each storage device 110 corresponds to one or more memory blocks (not shown). In various embodiments, the memory block may generally refer to a memory page or magnetic region within the HDD or SSD.

In some embodiments, each storage device 110 includes a storage controller 111 (e.g., HDD/SDD controller), a Power Line Communication (PLC) circuit 112, and a data interface 113 and a power interface 114.

The storage controller 111 is configured to control data access of the corresponding one or more memory blocks. For example, the storage controller 111 can be coupled to a processor (not shown) in a host system HOST via the data interface 113 to process instructions/commands from the processor. As such, the storage controller 111 can write data in the corresponding memory block. Similarly, the storage controller 111 can be coupled to other components of the system via the data interface 113 to communicate with other components of the host system.

The power line communication (PLC) circuit 112 is coupled between the power interface 114 and the storage controller 111. An embodiment of the PLC circuit 112 is a PLC bridge. The PLC circuit 112 is configured to carry at least one signal VC1 output by the storage controller 111 on the power signal output by the power source 103 to transmit at least one signal VC1 to the external device 102 via power line 101. In some embodiments, the PLC circuit 112 can perform modulation operation related to power line communication technique, such as Amplitude modulation (AM), Frequency modulation (FM), Amplitude-Shift Keying (ASK) modulation, Phase-Shift Keying (PSK) modulation, Frequency-Shift Keying (ASK) modulation, or Quadrature Amplitude Modulation (QAM), to carrier the signal VC1 on a power signal on the power line 101.

In some embodiments, the aforementioned at least one signal VC1 can be used to indicate the operational status of the corresponding memory block. The storage device 110 is further coupled to the power source 103 via the power line 101 to obtain the power required for the storage device 110 to operate with the corresponding memory block.

In various embodiments, the data interface 113 and/or power interface 114 is specifically selected to be applied to an external connection interface, where the storage device (e.g., hard disk) can be connected to an external device (e.g., Host) because the external connection interface facilitates connection to the external device. That is, all of the pins in the external connection interface for transmitting data are the pins of the data interface 113, and at least a portion of the external connection interface for receiving power (e.g., VDD) is the pin of the interface 114 and the power source 103 is located in the external device (e.g., Host). Therefore, when the user has to debug/monitor the hard disk, it is not necessary to disassemble the hard disk case, and then connect to the external pin set in the inside of the hard disk. The power interface 114 is specifically selected to be applied to at least one of pins of the external interface for receiving the power (for example, VDD), instead of the pins of the external interface for transmitting and receiving data, so that the data pins of the external interface are occupied or shared can be overcome. If the data pins of the external interface are occupied or shared, the function of the external interface of the storage device may not meet the requirements of different manufacturers, resulting in reduced compatibility of the storage device. Furthermore, conventional techniques cannot be debugged in a normal operation mode (e.g. an access operation) because the data portion pins in the external interface according to the conventional techniques are occupied or shared; otherwise, in the case where the data portion pins in the external interface of the present invention are not occupied or shared, the data storage device can be truly debugged/monitored in the normal operation mode (e.g. the access operation).

In a preferred embodiment, when the power pins of the external interface include a digital power pin (e.g., VDD) and an analog power pin (e.g., VCC), the power interface 114 is selected to be applied to a digital power pin (e.g., VDD). When the external interface includes digital power pins with different potentials (e.g. VDD1, VDD2; and VDD1>VDD2), the 114 is selected to be applied to a higher digital power (VDD1). In the above embodiments, the data interface 113 and the power interface 114 comply with the electrical characteristics of the external connection interface. When an embodiment of the present embodiment performs AM or FM modulation, the power interface 114 still comply with the electrical characteristic specification of the external connection interface.

In various embodiments, both of the data interface 113 and the power interface 114 can be implemented by various types of communication interfaces. For example, both of the data interface 113 and the power interface 114 are implemented by a Serial Advanced Technology Attachment (SATA) interface, where the data interface 113 corresponds to data pins of the SATA interface for transmitting and receiving data, and the power interface 114 corresponds to at least one of power pins of the SATA interface for receiving power. In this embodiment, the total pin number of the data interface 113 and the power interface 114 are the same as the total pin number of the SATA interface. That is, the data interface 113 and the power interface 114 comply with the specification of SATA. In some embodiments, the data interface 113 and the power interface 114 can be implemented by an Integrated Drive Electronics (IDE) interface. In this embodiment, the data interface 113 and the power interface 114 comply with the specification of IDE. In some embodiments, the interfaces 113 and 114 may be implemented by a Peripheral Component Interconnect Express (PCI-E) interface. In this embodiment, the interfaces 113 and 114 comply with the specification of PCIE. In an embodiment, the interfaces 113 and 114 can be implemented by a universal serial bus (USB.3x) interface. In this embodiment, the interfaces 113 and 114 comply with the specification of USB 3.x.

The above embodiments regarding the interfaces 113 and 114 are used for examples, but the present invention is not limited thereto. Various data transmission interfaces and/or power interfaces suitable for the data storage device 100 are within the scope of the present invention.

In some embodiments, the external device 102 can be an inspection and testing device. As described previously, the storage controller 111 can communicate with the external device 102 via the power line 101 and the PLC circuit 112 such that the user (e.g., engineer) can operate the external device 102 to simultaneously perform various procedures (e.g., monitoring, testing, inspecting) for the plurality of storage devices 110. For example, the external device 102 can send the signal VC2 to the storage controller 111 via the PLC circuit 112, wherein the signal VC2 represents at least one instruction associated with a monitoring program (eg, for debugging). The storage controller 111 can return the at least one signal VC1 to the external device 102 according to the signal VC2, so that the external device 102 recognizes the operating state of the corresponding memory block and/or storage device 110.

Figure 2:
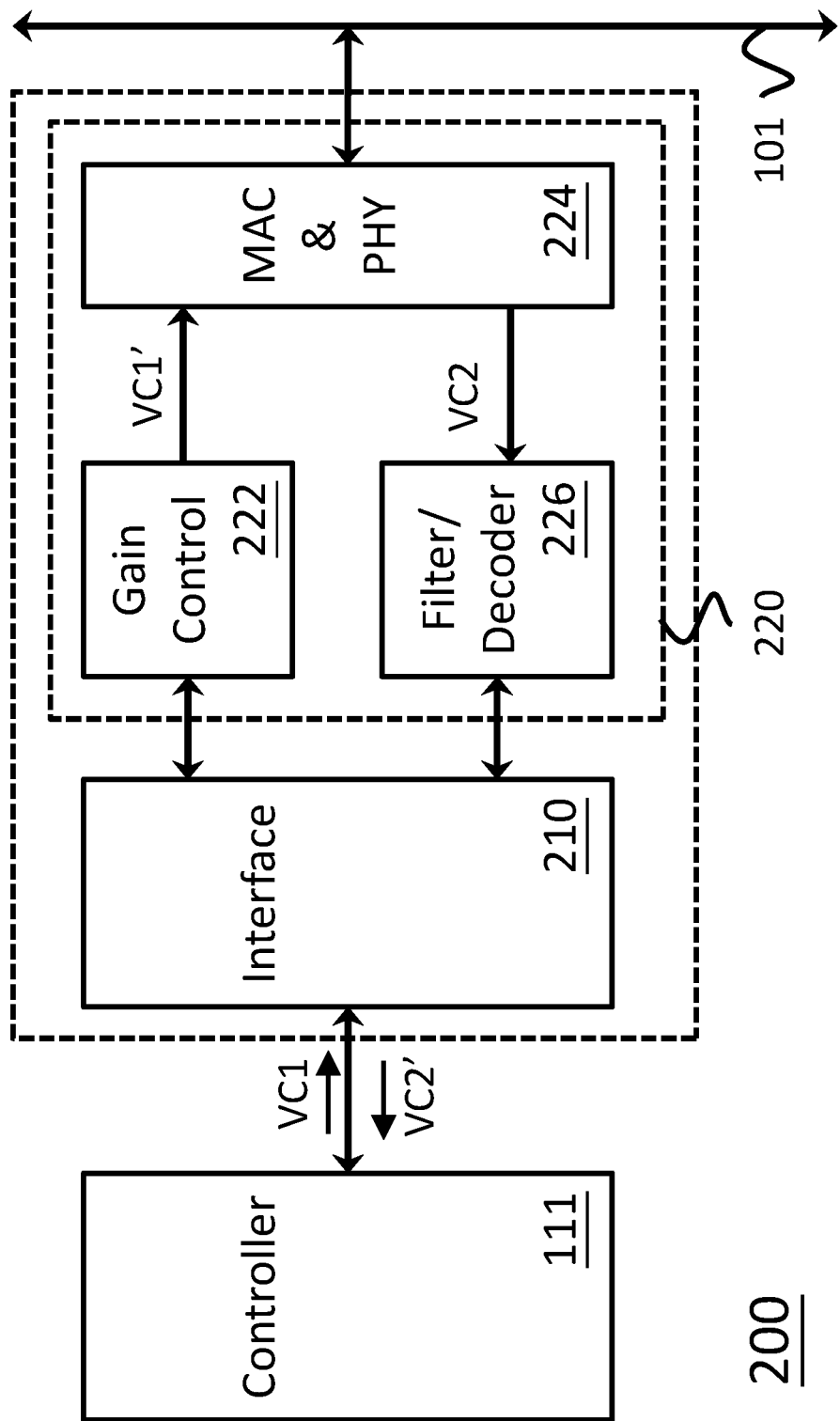
FIG. 2 illustrates a block diagram of an embodiment of storage control circuit of the storage device according to the present disclosure.

Compared with the conventional methods, without removing the casing of the storage device (HDD/SDD) or occupying the pins of the original interface of the storage device (HDD/SDD), the debugging program of the storage device 100 can be performed by using the power pin in the original transmission interface (e.g. SATA, PCIE, or IDE) via the PLC circuit 112. In this way, the convenience and efficiency of the debugging program can be significantly improved, and the compatibility of the storage device 100 is not lowered. In addition, the embodiment according to the present invention can simultaneously monitor/debug the plurality of storage devices 100. FIG. 2 is a schematic diagram of a storage controller 200 according to an embodiment of the present invention. For ease of understanding, similar elements in FIGS. 1 and 2 will be designated by the same reference numerals.

In some embodiments, the storage controller 111 and PLC circuit 112 may be implemented in different units or an integrated circuit, respectively. Alternatively, in some embodiments, storage controller 111 and PLC circuit 112 may be integrated into a single integrated circuit (e.g., storage control circuit 200).

For example, in some embodiments shown in FIG. 2, the storage control circuit 200 includes the storage controller 111, and the PLC circuit 112 which includes a communication interface 210, and a carrier circuit 220.

The carrier circuit 220 configures to communicate with the storage controller 111 and to receive the signal VC1 output by the storage controller 111 via the communication interface 210. In various embodiments, the communication interface 210 can be a Universal Asynchronous Receiver/Transmitter (UART) or an Inter-Integrated Circuit (I2C) or a System Management Bus (SMBus), or Power Management Bus (PMBus).

The carrier circuit 220 is coupled to the power line 101. The carrier circuit 220 is configured to perform a carrier operation (e.g., AM and/or FM operation) on the signal VC1 such that the signal VC1 is carried on the power signal on power line 101. In some embodiments, the carrier circuit 220 includes a modulator 222, a transceiver 224, and a de-modulator and decoder 226.

In an embodiment, the modulation circuit 222 is a gain control circuit 222 which is configured to perform an amplitude modulation (AM) operation and the de-modulator and decoder 226 includes a filtering circuit and a decoding circuit. In this embodiment, the gain control circuit 222 is configured to perform gain control operation to modulate the encoded signal VC1 from the storage controller 111. The transceiver 224 is coupled to the gain control circuit 222 to transmit the modulated signal VC1' to the external device 102 via the power line 101. In this manner, the external device 102 can acquire corresponding data (e.g., data address, device serial number, operation status, and the like) of the corresponding memory block based on the modulated signal VC1'. In one embodiment, the carrier circuit 220 further includes a potential detecting circuit (not shown) coupled to the power line 101 and the gain control circuit 222 for detecting an average potential on the power line to control the gain control circuit 222 ensures that the interface 114 can comply with the electrical specifications of the external connection interface (SATA, PCI-E, USB. 3X).

In some embodiments, the transceiver 224 receives the encoded signal VC2 from the external device 102 via the power line 101. The filtering and decoding circuit 226 is coupled to the transceiver 224 to receive the encoded signal VC2. The filtering and decoding circuit 226 is configured to demodulate/filter and decode the encoded signal VC2, and generate a decoded signal VC2'. The decoder 226 transmits the decoded signal VC2' to the storage controller 111 via the communication interface 210. As such, the storage controller 111 can acquire a related instruction/command from the external device 102 based on the decoded signal VC2'. In an embodiment, a filter in the filtering and decoding circuit 226 filters out the direct current (DC) component on the power signal on the power line to obtain the encoded signal VC2'.

Figure 3:
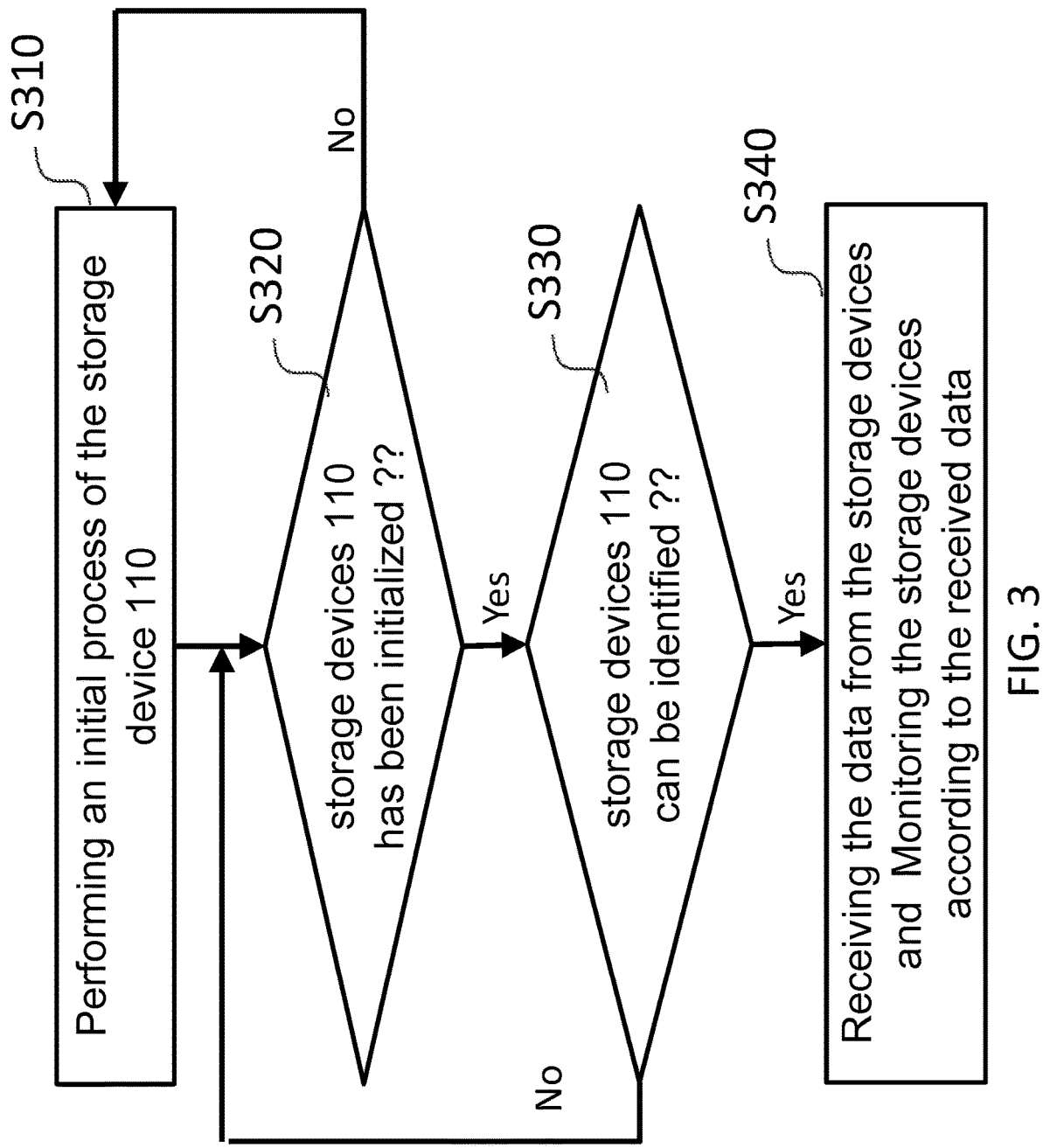
FIG. 3 illustrates a flowchart of an embodiment of the monitoring method of the present disclosure.

Referring to FIG. 3, FIG. 3 is a flow chart of a monitoring method 300 according to an embodiment of the present invention. For ease of understanding, the operation of the monitoring method 300 will be described together with reference to the storage device 100 of FIG. 1. In some embodiments, the monitoring method 300 includes a plurality of STEPs S310, S320, S330, and S340.

In STEP S310, perform an initialization procedure of the storage devices 110 is performed. For example, the external device 102 can transmit the signal VC2 including an initialization instruction to the plurality of storage devices 110 via the power line 101.

In STEP S320, the external device 102 checks whether all the storage devices 110 according to the present invention connected to the power line 101 have been initialized. If so, the STEP S330 will be performed; otherwise, The STEP S310 will be performed again.

In STEP S330, the external device 102 confirms whether each storage devices 110 according to the present invention has been identified. If so, STEP S340 will be performed; otherwise, the STEP S330 will be performed again. In an embodiment, the external device 102 will wait a predetermined interval in the STEP S330.

In STEP S340, the corresponding data of the storage devices 110 is transmitted to the external device 102 via the PLC circuit 112 and power line 101, and the external device 102 performs a monitoring process according to the corresponding data of the storage devices 110.

For example, in the initialization process (STEP S310), after receiving the signal VC2, the storage controller 111 of each storage device 110 will return a response signal VC1 to the external device 102, wherein the response signal VC1 contains various corresponding information (data addressing, device serial number, operating status, etc.) of the storage device 110. After confirming that the initialization process of all the storage devices 110 are completed the and the data of the storage device has been returned, the external device 102 can communicate with the storage controller 111 in the storage device 110 by the PLC circuit 112 to perform a debugging procedure. For example, the engineer can confirm that the signal VC1 returned by the storage controller 111 to confirm an operation status of the corresponding storage device 110 through the external device 102 such that the engineer can confirm whether there is a bad storage device 110 in the storage system 100.

The multiple steps of the above monitoring method 300 are merely examples, and are not limited to be performed in the order of this example. The various operations under the monitoring method 300 may be appropriately added, replaced, omitted, or performed in a different order, without departing from the scope of operation of the embodiments of the present invention.

The aforementioned descriptions represent merely the exemplary embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A storage control device for accessing at least one of memory blocks, the storage control device comprising:
    an interface configured to couple to a host, wherein the interface comprises a plurality of data pins and a plurality of power pins, wherein the storage control device receives an electric power from a power source via the plurality of power pins and a power line;
    a storage control circuit, coupled to the plurality of data pins, configured to access at least one of memory blocks according to a command from the host via the plurality of data pins, and to produce a response signal, wherein the response signal indicates an operation status of the at least one of memory blocks; and
    a power line communication (PLC) module, coupled between the storage control circuit and at least one of the plurality of power pins, configured to modulate the response signal to the power line via the at least one of the plurality of power pins of the interface.

2. The storage control device of the claim 1, wherein the response signal indicates at least one of data address of the at least one of memory blocks.

3. The storage control device of the claim 2, wherein the at least one of memory blocks is monitored according to the response signal.

4. The storage control device of the claim 1, the PLC module comprising:
    a transceiver coupled to the power line; and
    a modulation circuit, coupled to the transceiver, configured to modulate the response signal from the storage control circuit, and to generate a modulated signal to the power line via the transceiver.

5. The storage control device of the claim 4, wherein the modulation circuit comprises:

a gain control circuit configured to adjust a gain of the response signal.

6. The storage control device of the claim 5, wherein the modulation circuit further comprises:
   a detecting circuit, coupled to the at least one of the plurality of power pins, configured to detect a potential on the at least one of the plurality of power pins to generate a detected potential;
   wherein the gain control circuit is controlled according to the detected potential.

7. The storage control device of the claim 6, wherein the potential on the at least one of the plurality of power pins is controlled according to the detected potential such that the potential on the at least one of the plurality of power pins is complied with a predetermined specification.

8. The storage control device of the claim 1, wherein the at least one of the plurality of power pins is a digital power pin of the interface.

9. The storage control device of the claim 8, wherein the PLC module further comprises:
   a filter configured to filter out the direct current (DC) component on the power signal on the power line to obtain an encoded signal;
   wherein the PLC module decodes the encoded signal to generate a decode signal to the storage control circuit; and
   wherein the storage control circuit performs a corresponding program according to the decode signal to generate the response signal.

10. A storage control method for accessing at least one of memory blocks, the storage control method comprising:
    providing an interface comprising a plurality of data pins and a plurality of power pins, wherein the plurality of power pins receives an electric power from a power line;
    accessing, by a storage controller, at least one of memory blocks according to a command from a host via the plurality of data pins to generate a response signal, wherein the response signal indicates an operation status of the at least one of memory blocks; and
    modulating, by a power line communication (PLC) module, the response signal to generate an modulated signal to the power line via the at least one of the plurality of power pins of the interface.

11. The storage control method of the claim 10, wherein the response signal indicates at least one of data address of the at least one of memory blocks.

12. The storage control method of the claim 11, wherein the at least one of memory blocks is monitored according to the response signal.

13. The storage control method of the claim 10, wherein the step of modulating the response signal further comprises:
    detecting a potential on the at least one of the plurality of power pins to generate a detected potential; and
    adjusting a gain of the response signal according to the detected potential such that the potential on the at least one of the plurality of power pins is complied with a predetermined specification.

14. The storage control method of the claim 10, wherein the interface is one of a Serial Advanced Technology Attachment (SATA) interface, an Integrated Drive Electronics (IDE) interface, a Peripheral Component Interconnect Express (PCIE) interface, and a universal serial bus (USB) interface.

15. The storage control method of the claim 10, wherein the storage control method further comprises:
    acquiring, by the PLC module, an encoded signal in the power line on at least one of the plurality of power pins;
    decoding, by the PLC module, the encoded signal to generate a decoded signal to the storage controller; and
    performing, by the storage controller, a corresponding program according to the decoded signal.

16. The storage control method of the claim 15, wherein the step of acquiring the encoded signal further comprises:
    filtering out a direct current (DC) component on the electric power to obtain the encoded signal.

17. A storage control method for accessing at least one of memory blocks, the storage control method comprising:
    providing an interface comprising a plurality of data pins and a plurality of power pins, wherein the plurality of power pins receives an electric power from a power line;
    accessing, by a storage controller, at least one of memory blocks according to a command from a host via the plurality of data pins;
    acquiring, by a power line communication (PLC) module, an encoded signal in the power line on at least one of the plurality of power pins;
    decoding, by the PLC module, the encoded signal to generate a decoded signal; and
    performing, by the storage controller, a corresponding program according to the decoded signal from the PLC module.

18. The storage control method of the claim 17, wherein the step of acquiring the encoded signal further comprises:
    filtering out a direct current (DC) component on the electric power to obtain the encoded signal.

19. The storage control method of the claim 17, further comprising:
    modulating, by the PLC module, a response signal from the storage controller to generate an modulated signal to the power line via the at least one of the plurality of power pins of the interface;
    wherein the response signal indicates an operation status of the at least one of memory blocks.

20. The storage control method of the claim 19, wherein the response signal indicates at least one of data address of the at least one of memory blocks.

* * * * *